(12) United States Patent
Saif et al.

(10) Patent No.: US 9,124,561 B2
(45) Date of Patent: Sep. 1, 2015

(54) METHOD OF TRANSFERRING THE CONTROL OF A SECURITY MODULE FROM A FIRST ENTITY TO A SECOND ENTITY

(71) Applicant: Orange, Paris (FR)

(72) Inventors: Ahmad Saif, Avenay (FR); Bertrand Pladeau, Thaon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/350,738

(22) PCT Filed: Oct. 12, 2012

(86) PCT No.: PCT/FR2012/052338
§ 371 (c)(1),
(2) Date: Apr. 9, 2014

(87) PCT Pub. No.: WO2013/054065
PCT Pub. Date: Apr. 18, 2013

(65) Prior Publication Data
US 2014/0359295 A1 Dec. 4, 2014

(30) Foreign Application Priority Data
Oct. 14, 2011 (FR) .................................... 11 59294

(51) Int. Cl.
*H04L 9/32* (2006.01)
*H04L 29/06* (2006.01)
*H04W 12/04* (2009.01)

(52) U.S. Cl.
CPC ........ *H04L 63/0442* (2013.01); *H04L 63/0823* (2013.01); *H04W 12/04* (2013.01)

(58) Field of Classification Search
CPC H04L 63/0442; H04L 63/0823; H04W 12/04

USPC .......................................................... 713/173
See application file for complete search history.

(56) References Cited

U.S. PATENT DOCUMENTS 6,879,690 B2 * 4/2005 Faccin et al. .................. 380/247
2002/0062451 A1 * 5/2002 Scheidt et al. ................ 713/201

(Continued)

FOREIGN PATENT DOCUMENTS

WO 2010/123890 A1 10/2010
WO 2011/001076 A2 1/2011

OTHER PUBLICATIONS

International Search Report and Written Opinion dated Feb. 21, 2013 for corresponding International Patent Application No. PCT/FR2012/052338, filed Oct. 12, 2012.

(Continued)

*Primary Examiner* — Teshome Hailu
(74) *Attorney, Agent, or Firm* — David D. Brush; Westman, Champlin & Koehler, P.A.

(57) ABSTRACT

A method is provided for transferring control of a security module from a first entity to a second entity. The security module has a first security domain controlled by the first entity by at least one first secret control key specific to the first entity, and a second security domain, the second domain containing a private key and a certificate of a public key of a controlling authority. The method includes: receiving a request to obtain the certificate; sending the certificate; receiving data encrypted by the public key of the certificate, the data including at least one second secret control key specific to the second entity; decrypting the data; verifying the data; and if the verification is positive, replacing the at least one first secret control key by the at least one second secret control key.

11 Claims, 3 Drawing Sheets

(56) References Cited

U.S. PATENT DOCUMENTS

| | | | |
|---|---|---|---|
| 2002/0114469 A1* | 8/2002 | Faccin et al. | 380/270 |
| 2002/0152393 A1* | 10/2002 | Thoma et al. | 713/189 |
| 2005/0075986 A1* | 4/2005 | You et al. | 705/71 |
| 2007/0106892 A1* | 5/2007 | Engberg | 713/168 |
| 2007/0220591 A1* | 9/2007 | Damodaran et al. | 726/4 |
| 2010/0062808 A1 | 3/2010 | Cha et al. | |

OTHER PUBLICATIONS

International Preliminary Report on Patentability and English Translation of the Written Opinion dated Apr. 15, 2014 for corresponding International Patent Application No. PCT/FR2012/052338, filed Oct. 12, 2012.

French Search Report and Written Opinion dated Jun. 7, 2012 for corresponding French Patent Application No. 1159294, filed Oct. 14, 2011.

* cited by examiner

METHOD OF TRANSFERRING THE CONTROL OF A SECURITY MODULE FROM A FIRST ENTITY TO A SECOND ENTITY

CROSS-REFERENCE TO RELATED APPLICATIONS

This Application is a Section 371 National Stage Application of International Application No. PCT/FR2012/052338, filed Oct. 12, 2012, which is incorporated by reference in its entirety and published as WO 2013/054065 on Apr. 18, 2013, not in English.

FIELD OF THE DISCLOSURE

The present invention relates to a method of transferring the control of a security module from a first entity to a second entity.

The invention finds a particularly advantageous application in fields such as those of mobile telephony, or of machine to machine "M2M" communication. In these fields, pieces of equipment such as a mobile telephone or a machine having sensors, include a security module or "secure element", e.g. a universal subscriber identity module "(U)SIM" that is preconfigured to operate with a first network operator. For this purpose, keys specific to a manager of the module, e.g. the network operator for a (U)SIM card, and to the security module are preinstalled in the module before it is put into service. Thus, once the module has been released, the first network operator controls the card and is the only operator capable of installing applications in the card, of performing updates, of authenticating the (U)SIM card, etc.

BACKGROUND OF THE DISCLOSURE

When a subscriber to a first network seeks to change operator, it is necessary for the security module that is in the equipment and that is configured for the first operator to be replaced by a second security module that is configured for the second operator, i.e. that has the keys specific to the second operator. It can be understood that with interconnected M2M machines using the network of the first operator to enable a central server to exchange information remotely with those machines, a change of operator requires the (U)SIM card to be changed in all of the machines and therefore requires a technician to visit them in order to make the change. That can be particularly constraining since it is not unusual for the machines to be difficult of access. Furthermore, when the security modules are not removable, but are soldered to the equipment, such a change requires the equipment to be replaced.

Solutions exist for modifying operator keys in a (U)SIM card without changing the security module. For example, the application published under the No. WO 2011/001076 describes a method of changing a first authentication key and a first subscriber identification number in a (U)SIM card that are specific to a first network operator operating a first network, with a second authentication key and a second subscriber identification number specific to a second network operator operating a second network. For that purpose, a master key for generating keys specific to the second network is stored in the card during a preconfiguration stage performed before the card is put into service. Thus, when the card has been released to operate in the first network and a request is received to change to the second operator, the second operator transmits to the first operator a second subscriber identification number in the second network. The first operator uses its own network to transmit a random number and the second subscriber identification number that it has received to the (U)SIM card, and it also sends the random number to the second network operator. The card then generates a second authentication key by applying a key diversification algorithm to the random number and to the master key stored in the card and specific to the second network. In parallel, the second operator calculates the same authentication key using the same master key that is specific thereto and the random number received from the first network. The second operator stores the second authentication key in association with the second subscriber identification number in its own subscriber base. At the end of the method, the first authentication key has been replaced in the card by the second authentication key, and the first subscriber identification number has been replaced in the card by the second subscriber identification number. The (U)SIM is thus ready to operate in the second network.

Nevertheless, that requires the memory to store master keys specific to all of the operators to which control of the card might be transferred. There are also risks that it will not be possible to transfer the control of cards to a new operator, e.g. in the event of the cards being preconfigured before the arrival of the new operator.

SUMMARY

An exemplary embodiment of the present disclosure is directed to a method of transferring the control of a security module from a first entity to a second entity, the security module having a first security domain controlled by the first entity by means of at least one first secret control key specific to the first entity, and a second security domain, said second domain including both a certificate of a public key of a controlling authority and also a private key of the controlling authority, the method comprising the following steps performed by the security module:

the second security domain receiving a request to obtain a certificate, the request coming from the second entity;

the second security domain sending said certificate;

the first security domain receiving data from the second entity, which data has been encrypted by means of the public key certified by said certificate, the data including at least one second secret control key specific to the second entity;

the second security domain decrypting said data;

the first security domain verifying the data; and if the verification is positive, the first security domain replacing the at least one first secret control key with said at least one second secret control key.

The method of the invention thus makes it possible to update the security data of a multi-application security module without prior installation of initial configuration data, i.e. without such data being installed before the module is put into service. Such security data comprises keys specific to the issuer of the module for use in all sensitive procedures performed on and for the security module. Thus, the method is adapted to existing security modules, and it only requires the software of such modules to be updated. The updated software then enables security modules to perform the method of the invention. Such updating can be performed remotely.

Such a method is particularly suited to environments in which the security module, e.g. a (U)SIM card, is soldered into the equipment that hosts it (this is commonly referred to as "SIM on Chip"). The soldered SIM card is a solution that can be preferred for M2M machines that operate in difficult environmental conditions. The soldered SIM card solution presents advantages compared with a conventional removable SIM card, for example advantages of greater mechanical strength and of operating over larger temperature ranges. The method of the invention thus provides a solution to the problem of transferring the control of a soldered SIM card, e.g. in M2M environments.

The request transfer control may come from the issuer of the card. It may also come from a trusted third-party entity. By way of example, such an entity may be a recognized trusted authority, or the entity to which control is to be transferred, providing a more trusted authority certifies that the entity is trusted. Such a chain of trust can be put into place by means of certificates.

In an implementation, the method comprises a reception step of receiving from the first entity a request to transfer control to the second entity.

This implementation illustrates the situation in which the request to transfer the control of the module comes from the first entity, i.e. from the entity initially having control over the security module.

In this implementation, the transfer request includes a certificate of the second entity.

Including the certificate of the second entity in the request to transfer control that is sent to the issuer security domain enables the security module to verify that control is indeed being taken over by the entity identified in the transfer request.

In another implementation, the transfer request includes a unique identifier of the second entity.

Including a unique identifier of the second entity in the transfer request sent to the issuer security domain provides additional means for verifying the identifier of the entity that is to take over control of the module.

In an implementation, the method includes a step of the first security domain calculating a signed unique token and sending it to the first entity.

This implementation corresponds to the situation in which the token is calculated by the issuer security domain. This token is then sent to the first entity, which retransmits it to the second entity. This token serves to guarantee to the issuer security domain that the second entity that is to take over control of the module is indeed the entity for which the first entity initiated such a transfer.

In an implementation of the method, the data also includes a unique token signed by the issuer first domain.

The signed token is included in the data encrypted by the second entity using the certificate public key of the module. This enables the issuer security domain to verify that the token it has received in the encrypted data does indeed correspond to the unique token that it generated initially.

In an implementation in which the method includes a step of calculating and sending a single token, the unique token also includes an identifier specific to the security module.

Including an identifier of the security module in the token enables the second entity to verify that it is indeed transmitting its secret key to the appropriate security module, i.e. to the module over which it is actually seeking to take control.

In an implementation, the encrypted data is signed by a second entity, verification of the data consisting in verifying the signature of the data.

In this implementation, the second entity uses a private key that is specific thereto to sign data that it sends to the first security domain, i.e. the issuer security domain. Thus, the first security domain can verify the signature of the data by means of the public key associated with the private key of the second entity, and can thus verify that the encrypted data that includes the new key to be installed in the module does indeed come from the entity to which the first entity has requested control to be transferred.

Advantageously, the decryption step of the method of the invention comprises the substeps of:

the first security domain sending to the controlling authority security domain a request to decrypt said data;

the controlling authority security domain decrypting said data by means of the secret key of the controlling authority; and the controlling authority security domain sending the decrypted data to the first security domain.

The transfer of keys from the second entity to the first security domain is made secure by the controlling authority, and more precisely by the controlling authority security domain installed in the security module. This security domain represents a trusted third-party entity that is independent of the first and second entities. This trusted entity is represented in the module by a private key/public key pair and a certificate for the public key. This pair of keys is advantageously used for transmitting the keys of the second entity to the first security domain in encrypted form, and for decrypting said encrypted data. In fact, it is the issuer security domain that makes the request to the controlling authority security domain to perform the decryption since it is only the controlling authority that holds the secret key that is necessary for decrypting the keys that have been encrypted by the second entity using the certified public key of the security domain of the trusted authority.

The invention also provides a security module comprising a first security domain and a second security domain, said second security domain containing both a certificate of a public key of a controlling authority and also a secret key of the controlling authority, the first security domain being controlled by a first entity by means of at least one first control key specific to the first entity, the module further comprising:

first reception means arranged to receive a request to obtain a certificate coming from a second entity;

sender means arranged to send said certificate to the second entity;

second reception means arranged to receive from the second entity data that has been encrypted by means of the public key certified by said certificate, the data including at least one second secret control key specific to the second entity;

decryption means arranged to decrypt said data;

verification means arranged to verify said data; and installation means arranged to install said at least one second secret control key, the second entity then controlling the first security domain.

The invention also provides a signal for being transmitted between a first entity of a network and a first security domain included in a security module controlled by a second entity, the first entity previously having a public key certificate specific to a second security domain of said module, the signal including data encrypted by means of the public key certified by the certificate, said data including at least one secret key specific to the first entity of the network.

The invention also provides a program for installing in a security module, the program including instructions for performing steps of the method of transferring control of the module from a first entity to a second entity, which steps are executed by the module when the program is executed by a processor.

The invention also provides a data medium having the computer program of the invention.

BRIEF DESCRIPTION OF THE DRAWINGS

Numerous details and advantages of the invention can be better understood on reading the accompanying description of particular implementations given in non-limiting manner with reference to the drawings, in which.

DETAILED DESCRIPTION OF ILLUSTRATIVE EMBODIMENTS

Figure 1:
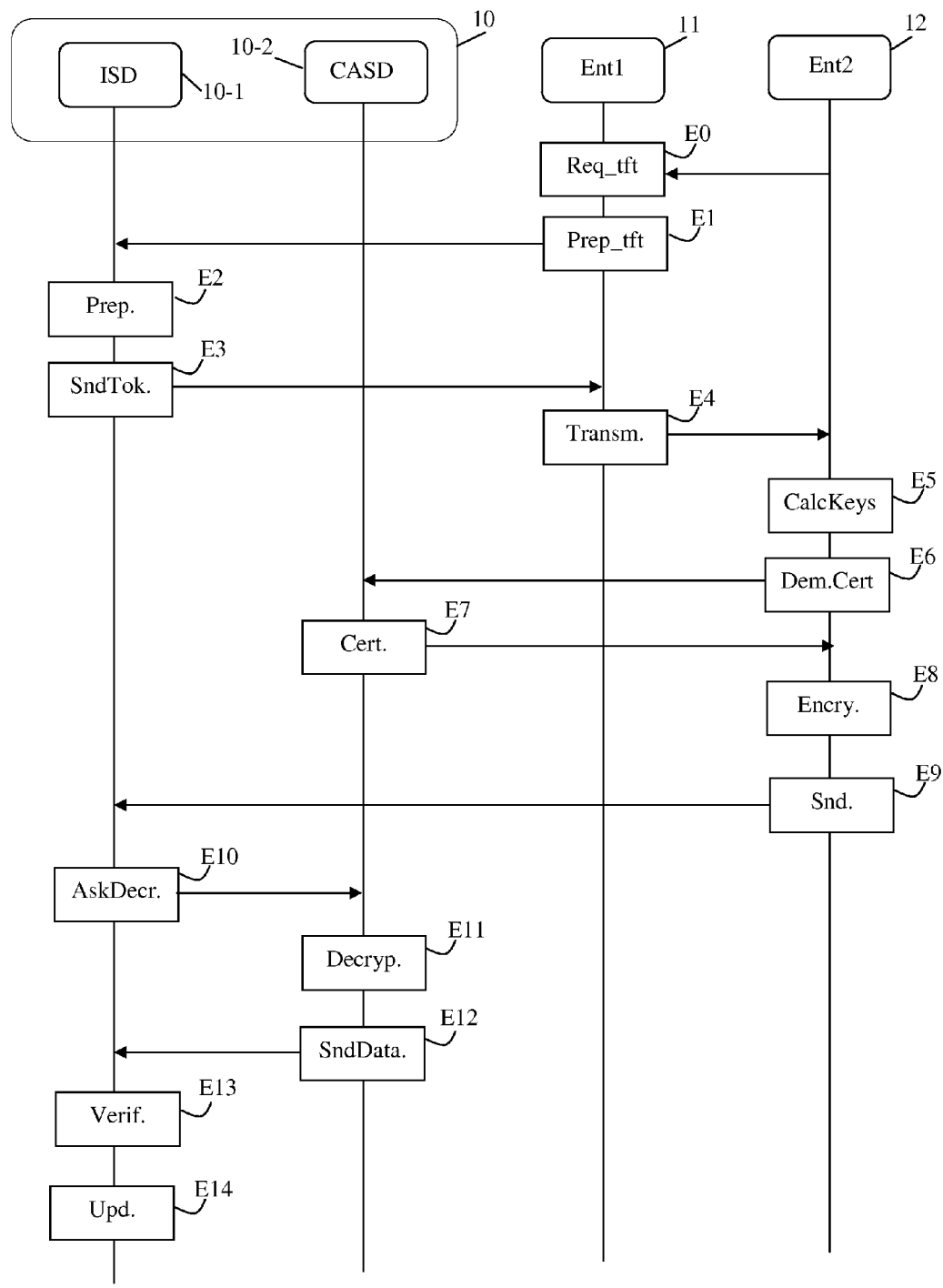
FIG. 1 shows the steps of a method of transferring the control of a security module from a first entity to a second entity in a first implementation of the invention.

With reference to FIG. 1, there follows a description of a method of transferring the control of a security module from a first entity to a second entity in a first implementation.

The invention applies to security modules, e.g. a module 10 complying with the GlobalPlatform specifications. Such specifications are accessible in the document "Specifications: GlobalPlatform Card specifications v2.2—Amendment A v1.0". The GlobalPlatform specifications describe components that make it possible to be unaware of the hardware of a security module by specifying interfaces that give access to applications installed in the module. By way of example, the hardware device may a universal subscriber identity module or "(U)SIM". In the GlobalPlatform specifications, a security module is structured as a plurality of logical security domains. A first security domain, referred to as the issuer security domain or "ISD" is the main security domain of the module. This security domain is representative of an entity that issued the security module. The issuer security domain has cryptographic primitives and keys specific to the issuer enabling those primitives to be performed. The cryptographic primitives are for enabling secure management of applications stored in the module. For example, the primitives are for controlling and securing operations of installing, uninstalling, updating, blocking, etc. applications in the module, the applications belonging to the issuer of the module or to other suppliers of applications. Like the issuer security domain, a security module may also have security domains representing service suppliers in the module, and also a security domain representing a controlling authority security domain, or "CASD". The controlling authority is a third-party entity independent of the issuer of the security module. The controlling authority security domain is optional, and when present it serves to reinforce the security policy of the module. The controlling authority security domain has a key pair, i.e. a pair comprising a private key and an associated public key for use in asymmetrical cryptography. It also includes a public certificate for certifying the public key associated with the private key. It should be recalled that a certificate is a digital identity card that associates a certified public key with a physical entity, in this example the security module 10. The certificate is delivered by a certification authority, in this example the third-party entity, after performing a prior secure procedure. Once the certificate is delivered, the public key and the private key can be used by services that perform security functions, for example an electronic signature service, a data encryption service, etc. A known example of a certificate format is the X.509v3 format. The keys of the CASD are independent of the issuer of the module and they represent the trusted third-party entity. The keys and the certificate are installed in the controlling authority security domain in the factory, e.g. by the card maker.

In the presently-described implementation, the security module 10 complies with the GlobalPlatform specifications mentioned briefly above and it therefore includes an issuer security domain or ISD 10-1, together with a controlling security domain or CASD 10-2.

The issuer of the presently-described module is a first entity 11, e.g. a first mobile network operator. The issuer security domain 10-1 thus initially includes secret keys belonging to this first entity 11. These keys are for securing exchanges between the module 10 and entities external to the module (not shown), for authenticating external entities, and for authenticating the issuer security domain 10-1 with those entities. Thus, depending on the needs and the functions associated with the security module 10, one or more secret keys may be calculated and installed in the security module 10. For example, the keys may be symmetrical keys for use by the data encryption standard "DES" cryptographic algorithm, or by the triple DES "3DES" algorithm, as basic primitives for performing security functions such as an electronic signature, a signature verification, etc. Such algorithms conventionally use one or more secret keys having a size of 112 bits or 168 bits. It can thus be understood that transferring control of the module 10 from the first entity 11 to a second entity 12 consists in installing secret keys belonging to the second entity 12 in the issuer security domain 10-1.

In an initial step E0 of requesting transfer, the first entity 11, which is in charge of managing the module 10, and which is thus in charge of managing the issuer security domain 10-1, receives from the second entity 12 a request to transfer control of the module 10 to itself. By way of example, the second entity 12 is a second mobile network operator. By means of this request, the second entity 12 is requesting to take control of the module 10 instead of the first entity 11. The request from the second entity 12 may follow a request made by a subscriber in possession of the security module 10 to the first entity 11, requesting a change of subscription in favor of the second entity 12. In an implementation in which the first and second entities 11 and 12 are first and second mobile network operators, such a request corresponds to a request made to the first operator requesting a change of operator so as to join the second operator.

In a following step E1 of preparing the transfer, the first entity 11 sends a transfer preparation request to the security module 10. More precisely, the request is sent to the issuer security domain 10-1.

In a step E2 of receiving the transfer and transfer preparation request, the security module 10, and more precisely the issuer security domain 10-1, prepares the transfer to the second entity 12 by calculating a unique token that is dedicated to the current transfer request. In a first implementation, the token is a random number generated by the issuer security domain 10-1; it is signed by means of a secret key specific to the issuer security domain 10-1. The signature thus corresponds to an authentication message known as a message authentication code "MAC" that guarantees the integrity of the token. The unique token is to be presented by the second entity 12 and to be verified by the second entity when it actually takes over control of the module 10.

In a step E3 of transmitting the token, the issuer security domain 10-1 sends the signed token to the first entity 11, i.e. sends the token and the associated authentication message. The signed token is transmitted in secure manner. In the example of a mobile network in which the first entity is a first operator and the second entity is a second operator, the token is transmitted over the network of the first operator via a secure tunnel, e.g. by using the secure socket layer "SSL" protocol.

In a retransmission step E4, the first entity 11 transmits the signed token that it has received to the second entity 12. This token is transmitted in order to inform the second entity 12 that the module 10 is ready for the transfer of control. The token is preferably transmitted in secure manner to the second entity 12. In a first implementation, a secure channel is established between the first and second entities 11 and 12. Methods of providing a secure channel between two entities are assumed to be known and are therefore not described in detail herein.

In a key calculation step E5, following the retransmission step E4, the second entity 12 calculates at least one secret key for installing in the issuer security domain 10-1 of the module 10 when the second entity 12 actually takes over control of the module 10.

In a step E6 of requesting a certificate from the module, the second entity 12 sends a certificate request to the security module 10, and more precisely to the controlling authority security domain 10-2.

In a step E7 of sending the certificate of the module 10, following reception of the certificate request sent during the previous step, the security module 10, and more precisely the controlling authority security domain 10-2, sends to the second entity 12 the certificate that is associated with the public key of the controlling authority security domain 10-1. Since this is public data, there is no need to take precautions for sending this certificate to the second entity 12 in a manner that is secure.

In an encryption step E8, the second entity 12 encrypts data comprising the keys that it calculated during the key calculation step E5, together with the signed token that it received from the first entity 11 during the retransmission step E3. The data is encrypted by applying an encryption algorithm using as a parameter the public key of the controlling authority security domain 10-2 as extracted from the certificate. The encryption algorithm that is to be used is specified in the certificate of the module in a dedicated field. By way of example, such an algorithm is the RSA algorithm (named after its inventors River, Shamir, and Adleman). Thus, the keys and the signed token are encrypted for the attention of the controlling authority security domain 10-2. Prior to encrypting the data, the second entity 12 can verify the validity of the certificate that it received during the preceding step. It can thus verify that the certificate has not expired; it can explore a complete certification chain in order to be sure of the validity of the signature of the certificate; it can also verify that the certificate has not been revoked. In known manner, such verification consists in interrogating a revocation server, or in consulting a list of revoked certificates. The second entity 12 can thus verify that the certificate of the security module 10 over which it is about to take control is indeed valid.

In a step E9 of sending encrypted data, the second entity 12 sends the encrypted data to the security module 10, and more precisely to the issuer security domain 10-1.

In a decryption request step E10, the issuer security domain 10-1 sends a decryption request to the controlling authority security domain 10-2. This request includes the previously received encrypted data. Only the controlling authority security domain 10-2 is capable of decrypting the encrypted data received by the issuer security domain 10-1, since it is only the controlling authority security domain 10-2 that possesses the private key associated with the public key used for encrypting the data.

In a decryption step E11, the controlling authority security domain 10-2 decrypts the encrypted data by means of its private key.

In a step E12 of sending decrypted data, the controlling authority security domain 10-2 sends the decrypted data to the issuer security domain 10-1.

In a verification step E13, the issuer security domain 10-1 verifies the validity of the signed token included in the decrypted data. For this purpose, the issuer security domain 10-1 calculates an authentication message for the token and verifies whether it corresponds to the authentication message received with the token. This verification makes it possible to sure that the token does indeed correspond to the token that was sent to the first entity 11 during the transmission step E3, and thus that the control of the module 10 is about to be given to the same entity as the entity for which the first entity 10 initiated the transfer of control. If the verification is positive, then during an updating step E14, the issuer security domain 10-1 stores the new keys of the second entity 12 included in the decrypted data and deletes all of the initially stored keys specific to the first entity 11. Thus, at the end of this updating step E14, the control of the module has indeed been transferred from the first entity 11 to the second entity 12. From now on it is the keys known solely to the issuer security domain 10-1 and to the second entity 12 that are installed in the security module 10.

During a subsequent stage (not shown) of use, the second entity 12 is suitable for sending orders to the security module 10, for installing data in secure manner in the module, for installing applications of service suppliers that have taken out contracts with the second entity 12 for this purpose, etc. For example, when the second entity is a mobile network operator, the operator may send to the security module a new authentication key $K_i$ specific to the subscriber who has just taken out a subscription with the second entity 12 so as to give that subscriber access to the network via the second operator. It may possibly send a new authentication algorithm suitable for authenticating the module on accessing the network.

In another implementation, the certificate and the public/key private key pair specific to the controlling authority are stored in an entity of the security module 10 other than the controlling authority security domain 10-2. For example, they are stored in another logical security domain of the module 10, or in another physical domain of the module 10, e.g. a memory zone that stores the operating system.

In another implementation, the transfer request sent by the first entity 11 to the issuer security domain 10-1 during the transfer preparation step E1 includes a certificate specific to the second entity 12. This certificate certifies a public key of a public/private key pair specific to the second entity 12. The certificate is sent to the issuer security domain 10-1 for the purpose of transmitting the certified public key of the second entity 12 to the issuer security domain 10-1 so as to enable the issuer security domain 10-1 to authenticate the second entity 12 when it sends the secret keys for giving it control over the module 10 during the step E9 of sending encrypted data. Thus, in this implementation, the second entity 12 uses its own private key to sign the data that is encrypted during the encryption step E8. The issuer security domain 10-1 then verifies the signature of the encrypted data sent thereto during the step E9 by means of the public key of the second entity 12 present in the certificate that the first entity 11 sent it. Furthermore, prior to sending the transfer request to the issuer security domain 10-1, the first entity 11 can verify the validity of the certificate of the second entity 12. For example, if the certificate has expired or if the certificate has been revoked, then the first entity does not transmit the transfer request to the issuer security domain.

In another implementation, the transfer request sent during the step E1 by the first entity 11 includes a unique and universal identifier of the second entity 12. This identifier is to enable the issuer security domain 10-1 to ensure that the entity that is to take over control of the module is indeed the entity for which the first entity 11 has issued a request. Thus, in this example, the second entity 12 acts during the step E9 to send to the issuer security domain 10-1 the data as encrypted and signed by means of its own private key, together with its certificate. The issuer security domain 10-1 can then verify that the field of the certificate corresponding to the unique identifier of the owner of the certificate is indeed equal to the unique identifier that was transmitted thereto by the first entity 11. Verifying the signature makes it possible to be sure that the certificate is indeed associated with the second entity 12 and that the unique identifier is thus indeed the identifier of the second entity 12. When the first and second entities are mobile telephony operators, the identifier is a universal mobile network code "MNC".

In another implementation, the issuer security domain 10-1 acts during the step E3 to send a token to the first entity 11, which token comprises not only a random value, but also a unique identifier of the security module 10. For example, the unique identifier may be concatenated with the random value. By way of example, the unique identifier is the internal serial number of the security module, known as the integrated circuit card ID "ICCID". Thus, the unique identifier of the security module 10 is included in the signed token and is transmitted to the second entity 12 during the retransmission step E4. This identifier of the module 10 is intended to guarantee to the second entity 12 that it is sending its keys to the proper security module 10. For this purpose, the second entity 12 verifies the signature of the token, and then, by way of example, on receiving the certificate at the end of step E7, it verifies that this identifier appears in the certificate of the module 10 that it requested during step E6. By way of example, the identifier appears in the holder field of the certificate of the controlling authority security domain 10-2.

The invention is not limited to these implementations. Thus, other implementations may consist in combining a plurality of the above-described implementations. It is thus possible to transmit from the first entity 11 to the issuer security domain 10-1 a certificate of the second entity 12 and a unique identifier of the second entity 12, and to act during the step E3 to transmit a token to the first entity 11, which token includes a unique identifier of the module 10. It can be understood that by combining various implementations, it is possible to enhance the security of the method.

Figure 2:
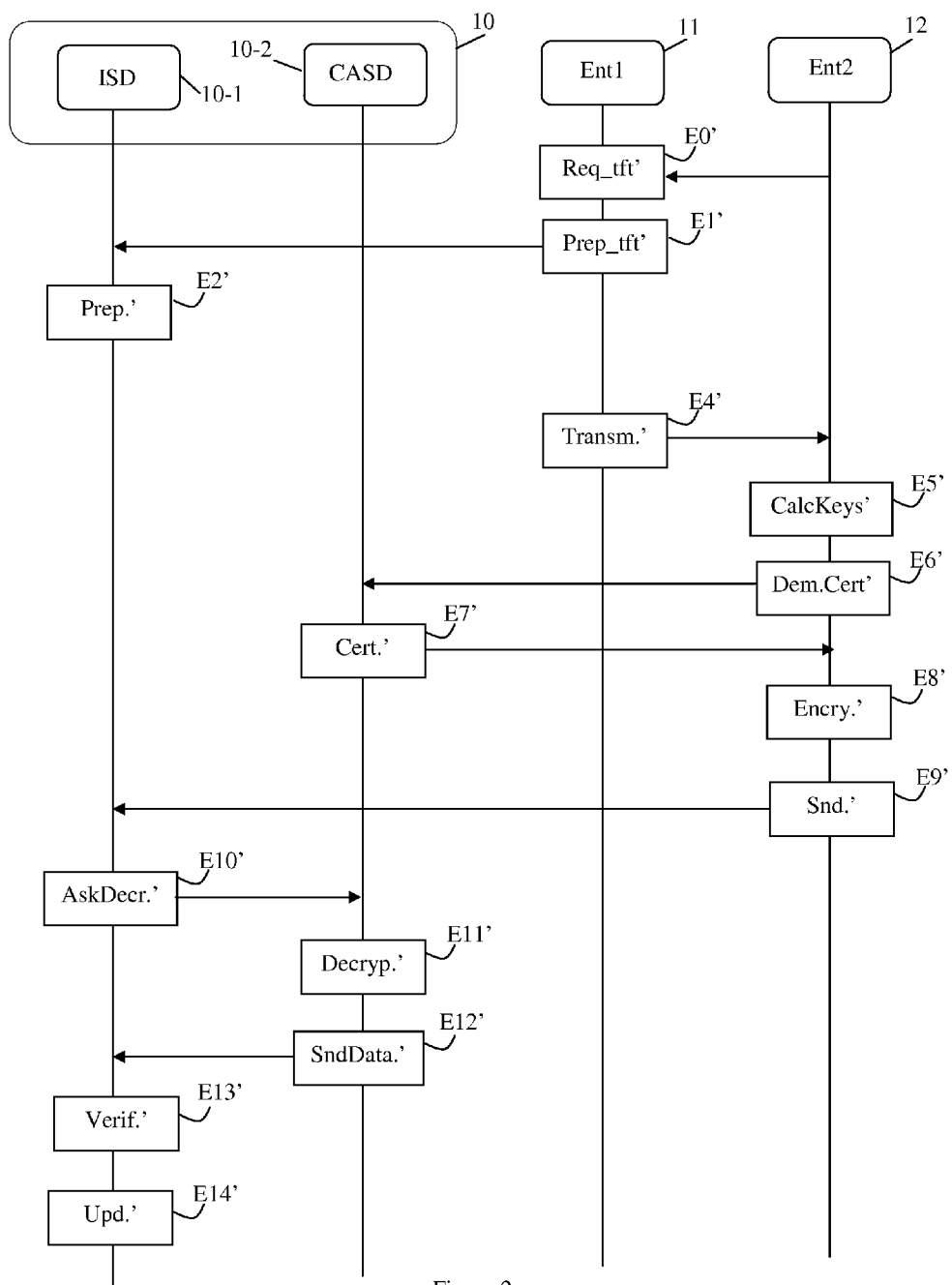
FIG. 2 shows the steps of a method of transferring the control of a security module from a first entity to a second entity, in a second implementation of the invention.

With reference to FIG. 2, there follows a description of a method of transferring control of a security module from a first entity to a second entity in a second implementation.

In this implementation, no unique token is calculated by the issuer security domain 10-1.

In an initial step E0' of requesting transfer, comparable to the step E0 of the method described with reference to FIG. 1, first entity 11 receives a request from the second entity 12 requesting control of the module 10 to be transferred to itself. In an implementation, the transfer request includes a unique identifier specific to the second entity 12. When the first and second entities are network operators, this identifier is the MNC of the second operator.

In a following step E1' of preparing the transfer, the first entity 11 sends a transfer preparation request to the security module 10. More precisely, the request is sent to the issuer security domain 10-1. In this implementation, the transfer preparation request includes an entity certificate specific to the second entity 12. In conventional manner, the entity certificate comprises a set of fields, such as the name of the holder of the certificate, specifically the second entity 12, a public key of the entity, etc. The public key of the entity is associated with a private key of the entity held and known solely by the second entity 12. The set of fields is signed by a private key of a certification authority. Thus, the entity certificate certifies the public key of the second entity 12. The second entity 12 can send its certificate to the first entity 11. In the event of the second entity 12 acting during the preceding step to send its own unique identifier to the first entity 11, the first entity 11 can obtain the certificate by interrogating a certificate server, while specifying the unique identifier of the second entity 12.

In a step E2' of receiving the transfer request, the security module 10, and more precisely the issuer security domain 10-1, receives the transfer preparation request. The issuer security domain stores the certificate of the second entity 12.

In an information step E4', the first entity 11 informs the second entity 12 that the security module 10 is ready to transfer control.

In a key calculation step E5' following the information step E4', the second entity 12 calculates at least one secret key for installing in the issuer security domain 10-1 of the module 10 when the second entity 12 actually takes control of the module 10.

In a step E6' of requesting a certificate from the module, the second entity 12 sends a certificate request to the security module 10, and more precisely to the controlling authority security domain 10-2.

In a step E7' of sending the certificate of the module 10, following reception of the certificate request sent during the preceding step, the security module 10, and more precisely the controlling authority security domain 10-2, sends the certificate to the second entity 12 in association with the public key of the controlling authority security domain 10-1.

In an encryption step E8', the second entity 12 encrypts data comprising the keys that it calculated during the key calculation step E5'. The data is encrypted by applying an encryption algorithm using as a parameter the public key of the controlling authority security domain 10-2 as extracted from the certificate of the module. The encrypted data is then signed by means of the private key of the second entity 12. Thus, the data is encrypted for the attention of the controlling authority security domain 10-2 and then signed by the second entity 12. Prior to encrypting the data, the second entity 12 can verify the validity of the certificate that it has received from the second security domain 10-2 during the preceding step.

In a step E9' of sending encrypted data, the second entity 12 sends the encrypted and signed data to the security module 10, and more precisely to the issuer security domain 10-1.

In a step E10' of requesting decryption, the issuer security domain 10-1 sends a decryption request to the controlling authority security domain 10-2. The request includes the previously received encrypted data. Only the controlling authority security domain 10-2 can encrypt the encrypted data received by the issuer security domain 10-1, since it is only the controlling authority security domain 10-2 that possesses the private key associated with the public key used for encrypting the data.

In a decryption step E11', the controlling authority security domain 10-2 decrypts the encrypted data by using its own private key.

In a step E12' of sending decrypted data, the controlling authority security domain 10-2 sends the decrypted data to the issuer security domain 10-1.

In a verification step E13', the issuer security domain verifies the signature of the data encrypted by means of the public key of the certificate of the second entity 12. If the verification is positive, that means that the encrypted data does indeed come from the second entity 12 for which the security domain 10-1 has received a request to transfer control during the step E1'. Only the holder of the private key associated with the public key certified by the certificate received by the issuer security domain 10-1 during the step E1' is capable of signing the encrypted data. In this implementation, the verification step E13' may be performed before the decryption request step E10'.

If the verification performed during the preceding step is positive, then during an updating step E14', the issuer security domain 10-1 stores the new keys of the second entity 12 included in the decrypted data and erases all of the keys that were initially stored and specific to the first entity 11. Thus, at the end of this updating step E14', control over the module has indeed been transferred from the first entity 11 to the second entity 12. From now on it is keys that are known only to the issuer security domain 10-1 and to the second entity 12 that are installed in the security module 10.

Figure 3:
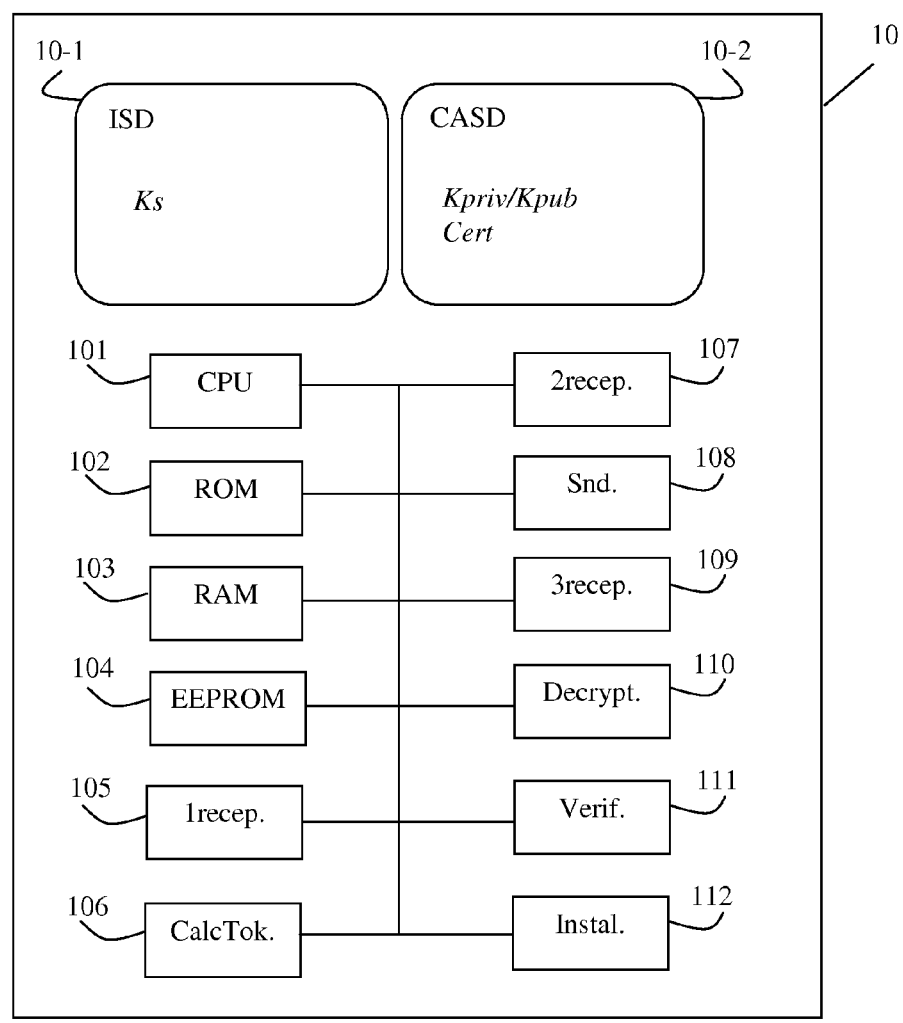
FIG. 3 shows a security module suitable for performing the control transfer method of the invention.

A security module 10 suitable for performing the above-described method is described below with reference to FIG. 3.

By definition, a security module designates a module suitable for performing operations that are critical and sensitive in an environment that is secure. By way of example, these operations are storing secret data, performing cryptographic operations, etc.

In an embodiment, the security module 10 of the invention complies with the GlobalPlatform specifications and therefore includes a plurality of logical security domains:

a first security domain or issuer security domain 10-1; and
a second security domain or controlling authority security domain 10-2.

The first domain contains at least one secret key Ks specific to an entity that controls the security module and that is to secure exchanges between the module and external entities. The second security domain 10-2 contains a key pair comprising a private key Kpriv and a public key Kpub, together with a certificate Cert for certifying the public key Kpub of the key pair. The certificate is issued by a third-party entity (not shown in FIG. 2), that is independent from the entity that controls the module 10. In a variant embodiment (not shown), the secret key and the certificate are stored in another logical security domain of the module 10, or in another physical domain of the module 10, e.g. a memory zone that stores the operating system.

The logical security domains also rely on:

a central processor unit "CPU" 101. The processor 101 is connected to a set of memories comprising:
  a read only memory "ROM" 102 adapted to store the operating system of the module, and security mechanisms, such as for example cryptographic algorithms;
  a random access memory "RAM" 103 used for performing calculations, loading instructions, and executing them; and
  an electrically erasable programmable read only memory "EEPROM" that contains elements specific to the holder of the module and to the type of network for which the module is intended. The EEPROM 104 thus stores the secret key Ks of the issuer security domain 10-1 together with the certificate and the pair of keys Kpriv/Kpub of the controlling authority security domain 10-2.

The security module 10 also hosts an application in the form of a program suitable for performing the method of the invention. For this purpose, the module 10 also comprises:

means 106 for calculating and sending a token, these means being arranged to calculate and send a single token to the first entity, said token comprising a random value. The calculation and sending means 106 are arranged to perform steps E2 and E3 of the above-described control transfer method;

first reception means 105 arranged to receive a request to obtain a certificate from the second entity. The first reception means 105 are arranged to perform the steps E6 and E6' of the above-described methods;

sender means 108 arranged to send said certificate on the first reception means 105 receiving a request. The sender means 108 are arranged to perform the sending steps E7 and E7' of the above-described methods of transferring the control of a module;

second reception means 107 arranged to receive from the second entity data that has been encrypted by means of the public key as certified by said certificate, the data including at least a second secret control key specific to the second entity, together with the token. The encrypted data is optionally signed by means of the private key specific to the second entity. The second reception means 107 are arranged to perform the steps E9 an E9' of the above-described method;

third reception means 109 arranged to receive from the first entity 11 (not shown in FIG. 3), a request to transfer control to the second entity 11 (not shown). The transfer request may include the certificate of the second entity 12. The third reception means 109 are suitable for performing the steps E1 and E1' of the above-described methods;

decryption means 110 arranged to decrypt said data. The decryption means 110 are arranged to perform the decryption steps E11 and E11' of the above-described methods;

verification means 111 arranged to verify the encrypted data. In the first implementation, the verification means 111 verify the token signed by the issuer security domain 10-1. In the second implementation of the method, the verification means 111 verify the signature of the encrypted data by means of the public key of the second entity. The verification means 111 are adapted to perform the steps E13 and E13' of the above-described methods of transferring the control of a module; and installation means 112 arranged to install said at least one second control secret key, the second entity then checking the first security domain. The installation means 112 are arranged to perform the steps E14 and E14' of the above-described methods.

In the embodiment described with reference to FIG. 3, the above-described means are installed by a security module manufacturer in the EEPROM 104 before the equipment that includes module is sold. In a second embodiment, the means are installed by the module manufacturer in the ROM 102. In a third embodiment, the program is downloaded into the equipment containing the module, after the equipment has been released.

Although the present disclosure has been described with reference to one or more examples, workers skilled in the art will recognize that changes may be made in form and detail without departing from the scope of the disclosure and/or the appended claims.

The invention claimed is:

1. A method comprising:
  transferring the control of a security module from a first entity to a second entity, the security module having a first security domain controlled by the first entity by at least one first secret control key specific to the first entity, and a second security domain, said second security domain including both a certificate of a public key of a controlling authority and also a private key of the controlling authority, wherein transferring comprises the following steps performed by the security module:

the second security domain receiving a request to obtain a certificate, the request coming from the second entity;

the second security domain sending said certificate;

the first security domain receiving data from the second entity, which data has been encrypted by the public key certified by said certificate, the data including at least one second secret control key specific to the second entity;

the second security domain decrypting said data;

the first security domain verifying the data; and if the verification is positive, the first security domain replacing the at least one first secret control key with said at least one second secret control key.

2. The method according to claim 1, including a reception step of receiving from the first entity a request to transfer control to the second entity.

3. The method according to claim 2, wherein the transfer request includes a certificate of the second entity.

4. The method according to claim 2, wherein the transfer request includes a unique identifier of the second entity.

5. The method according to claim 1, including a step of the first security domain calculating a signed unique token and sending it to the first entity.

6. The method according to claim 5, wherein the data also includes a unique token signed by the issuer first domain.

7. The method according to claim 5, wherein the unique token also includes an identifier specific to the security module.

8. The method according to claim 1, wherein the encrypted data is signed by a second entity, verification of the data consisting in verifying the signature of the data.

9. The method according to claim 1, wherein the decrypting step comprises the following substeps:

the first security domain sending to the controlling authority security domain a request to decrypt said data;

the controlling authority security domain decrypting said data by the secret key of the controlling authority; and the controlling authority security domain sending the decrypted data to the first security domain.

10. A security module hardware device comprising:

a first security domain and a second security domain, said second security domain containing both a certificate of a public key of a controlling authority and also a secret key of the controlling authority, the first security domain being controlled by a first entity by means of at least one first control key specific to the first entity;

at least one memory device; and a processing device configured by instructions stored in the at least one memory device to form the following elements:

first reception means arranged to receive a request to obtain a certificate coming from a second entity;

sender means arranged to send said certificate to the second entity;

second reception means arranged to receive from the second entity data that has been encrypted by the public key certified by said certificate, the data including at least one second secret control key specific to the second entity;

decryption means arranged to decrypt said data;

verification means arranged to verify said data; and installation means arranged to install said at least one second secret control key, the second entity then controlling the first security domain.

11. A non-transitory data storage medium comprising a program stored thereon for installing in a security module, the program including instructions for configuring the security module to perform steps of a method of transferring control of the module from a first entity to a second entity when the program is executed by a processor, wherein the method comprises:

transferring the control of the security module from the first entity to the second entity, the security module having a first security domain controlled by the first entity by at least one first secret control key specific to the first entity, and a second security domain, said second security domain including both a certificate of a public key of a controlling authority and also a private key of the controlling authority, wherein transferring comprises the following steps:

the second security domain receiving a request to obtain a certificate, the request coming from the second entity;

the second security domain sending said certificate;

the first security domain receiving data from the second entity, which data has been encrypted by the public key certified by said certificate, the data including at least one second secret control key specific to the second entity;

the second security domain decrypting said data;

the first security domain verifying the data; and if the verification is positive, the first security domain replacing the at least one first secret control key with said at least one second secret control key.

* * * * *